(12) United States Patent
Manzano et al.

(10) Patent No.: US 6,350,974 B1
(45) Date of Patent: Feb. 26, 2002

(54) HANDLED, MICROWAVE POPCORN SERVICE APPARATUS

(76) Inventors: Juan Manzano; Berenice Garcia, both of 2160 Mayport Rd., #805 Jacksonville, FL (US) 32233

( * ) Notice: Subject to any disclaimer, the term of this patent is extended or adjusted under 35 U.S.C. 154(b) by 0 days.

(21) Appl. No.: 09/699,749

(22) Filed: Oct. 30, 2000

(51) Int. Cl.$^7$ .................................................. H05B 6/80
(52) U.S. Cl. ...................... 219/735; 219/732; 219/734; 219/727; 99/DIG. 14; 221/150 A; 229/903
(58) Field of Search ................................. 219/725, 727, 219/732, 734, 735, 762; 99/DIG. 14; 221/150 A, 150 R; 229/903

(56) References Cited

U.S. PATENT DOCUMENTS

| | | | |
|---|---|---|---|
| 3,323,760 A | 6/1967 | Gereke | |
| 4,024,996 A | * 5/1977 | Dalke | 222/437 |
| 4,435,628 A | * 3/1984 | Bowen et al. | 219/734 |
| 4,477,705 A | * 10/1984 | Danley et al. | 219/732 |
| 4,490,597 A | * 12/1984 | Mengel | 219/735 |
| 4,491,220 A | 1/1985 | Daviss | |
| 4,503,559 A | 3/1985 | Warnke | |
| 4,532,397 A | * 7/1985 | McClelland | 219/735 |
| 4,795,873 A | * 1/1989 | Freedman et al. | 219/732 |
| 4,873,406 A | 10/1989 | Connor | |
| 4,933,529 A | * 6/1990 | Saville | 219/735 |
| 4,942,277 A | 7/1990 | Narberes | |
| 5,200,590 A | 4/1993 | Bowen et al. | |
| 5,263,255 A | 11/1993 | Watson | |
| 5,294,764 A | 3/1994 | Mass | |
| 5,387,781 A | * 2/1995 | Berkoff | 219/735 |
| 5,552,585 A | * 9/1996 | Fleck et al. | 219/732 |
| 5,770,839 A | 6/1998 | Ruebush et al. | |
| 5,780,824 A | * 7/1998 | Matos | 219/727 |
| 6,060,095 A | 5/2000 | Scrimager | |

* cited by examiner

Primary Examiner—Philip H. Leung
(74) Attorney, Agent, or Firm—John D. Gugliotta

(57) ABSTRACT

A handled, microwave popcorn service apparatus is provided for cooking and serving popcorn. A service bowl container is formed of a thermoplastic microwave penetrable material. The service container includes a dispensing tube and an access lid.

4 Claims, 3 Drawing Sheets

# HANDLED, MICROWAVE POPCORN SERVICE APPARATUS

RELATED APPLICATIONS

The present invention was first described in Disclosure Document No. 474,827 filed on May 30, 2000. There are no previously filed, nor currently any co-pending applications, anywhere in the world.

BACKGROUND OF THE INVENTION

1. Field of the Invention

The present invention relates generally to popcorn service bowls and, more particularly, to a handled, microwave popcorn service apparatus.

2. Description of the Related Art

Just about everyone enjoys the taste of popcorn. It can be found almost world wide, anywhere from movie theaters, to carnivals, to sporting events, to homes, and even in fancy restaurants. While many enjoy the taste of popcorn, most do not appreciate the messy aftereffects. No only is popcorn easy to drop on the floor, but the oil, butter, or salt can leave hands a mess and quickly get onto other surfaces such as clothes and furniture. Additionally, should one desire a large mouthful of popcorn, the mess grows exponentially larger as one grabs a big handful of popcorn and tries to jam it into their mouth.

Accordingly, there is a need for a means by which popcorn can be enjoyed in a manner with less mess and fuss than current methods. The development of the handled, microwave popcorn service apparatus fulfills this need.

A search of the prior art did not disclose any patents that read directly on the claims of the instant invention; however, the following references were considered related. The following patents disclose a microwave bag for popping popcorn: U.S. Pat. No. 6,060,095 issued in the name of Scrimager, U.S. Pat. No. 5,770,839 issued in the name of Ruebush et al.; and U.S. Pat. No. 5,200,590 issued in the name of Bowen et al.

The following patents describe a microwave popcorn popper with a snap-on cover: U.S. Pat. No. 4,942,277 issued in the name of Narberes; and U.S. Pat. No. 4,873,406 issued in the name of Connor.

U.S. Pat. No. 5,294,764 issued in the name of Mass discloses a reusable microwave popcorn container.

The following patents describe a container for holding popcorn and a drink cup: U.S. Pat. No. 4,491,220 issued in the name of Daviss; and U.S. Pat. No. 3,323,706 issued in the name of Gereke.

U.S. Pat. No. 5,263,255 issued in the name of Watson discloses an elongated, trough-like utensil for eating popcorn.

U.S. Pat. No. 4,503,559 issued in the name of Warnke describes a popcorn bag for holding popcorn while a person eats out of it.

Consequently, a need has been felt for providing a device which allows one to enjoy eating popcorn in a manner with less mess and fuss when compared to conventional means using one's hands.

SUMMARY OF THE INVENTION

Therefore, it is an object of the present invention to provide a popcorn eating aid device which allows one to enjoy the taste of popcorn with little or no mess.

It is another object of the present invention to provide a popcorn eating aid device where there is no actual touching of the popcorn by the hands of the consumer.

It is still another object of the present invention to provide a popcorn eating aid device which keeps hands free of oil, butter, and/or salt.

It is still another object of the present invention to provide a popcorn eating aid device which reduces spill on the floor.

It is another object of the present invention to provide a popcorn eating aid device with a hollow handle for allowing popcorn to exit therefrom and enter the mouth of the consumer.

It is another object of the present invention to provide a popcorn eating aid device with a hollow handle which allows more popcorn to be consumed at one time.

It is another object of the present invention to provide a popcorn eating aid device with a hollow handle which can be easily cleaned.

It is another object of the present invention to provide a popcorn eating aid device with a screw-on lid for security.

It is another object of the present invention to provide a popcorn eating aid device with a screw-on lid which allows for ease in filling and cleaning.

It is another object of the present invention to provide a popcorn eating aid device with a screw-on lid which allows additional toppings to be added and reduces smell of popcorn in an immediate area which may be undesirable to others.

Briefly described according to one embodiment of the present invention, a handled, microwave popcorn service apparatus is provided for aiding in the eating of popcorn. Upon initial observation, the invention looks remarkably like a clear plastic pot with a screw on lid and handle. But after closer inspection, it can be seen that the handle is a hollow tube. To use the invention, a conventional bag of microwave popcorn is popped in a microwave oven according to the manufacturer's instructions. Next, the bag is opened and poured into the invention, and the lid is screwed on. When the user desires popcorn, the end of the tube is placed against the user's mouth and the invention tipped slightly. The popcorn will then exit the invention and enter the user's mouth. The invention provides a means to keep the user's hands clean and free from the oils, salt, and/or butter commonly found on popcorn.

The use of the present invention allows one to enjoy eating popcorn in a manner with less mess and fuss when compared to conventional means using one's hands.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENT

1. Detailed Description of the Figures

Figure 1A:
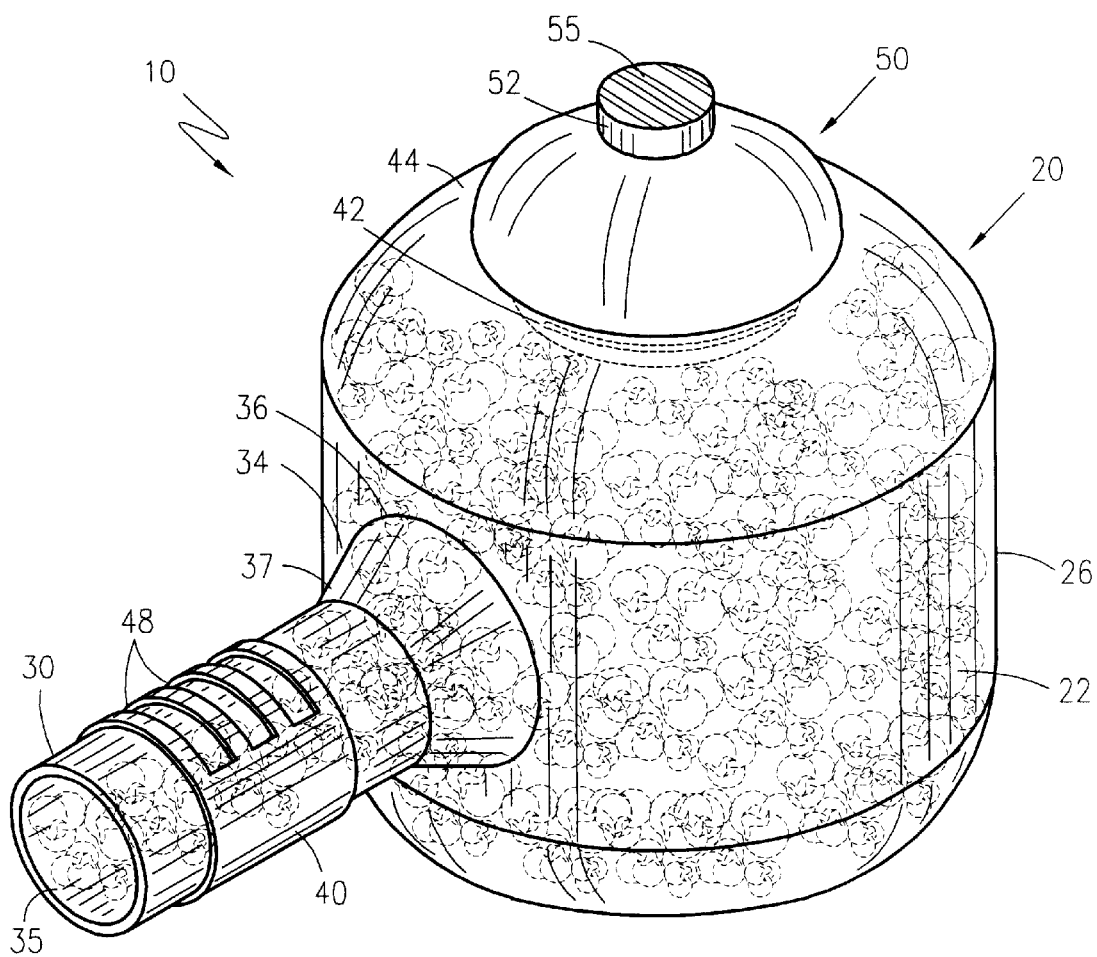
FIG. 1a is a front perspective view of a handled, microwave popcorn service apparatus according to the preferred embodiment of the present invention.
Figure 1B:
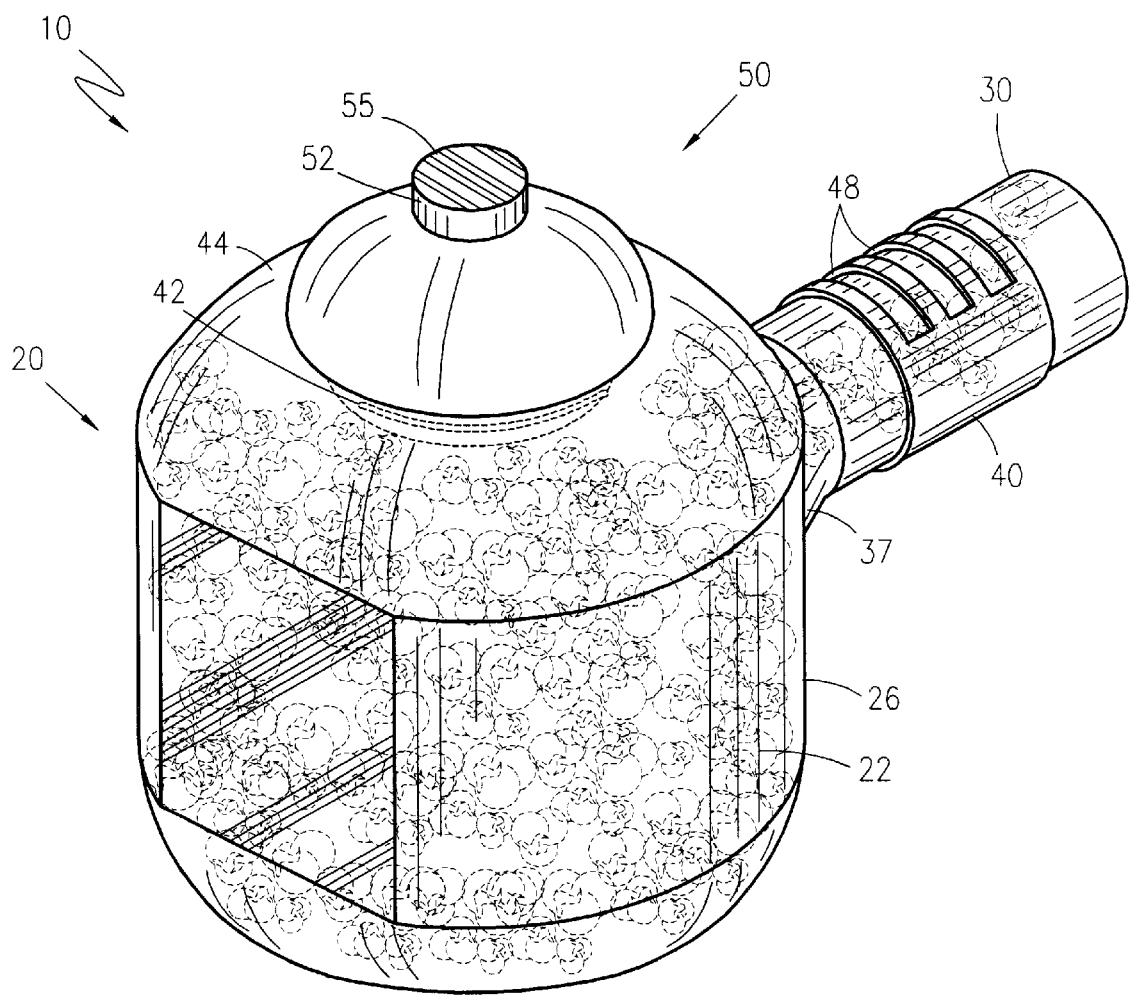
FIG. 1b is a rear perspective view thereof.
Figure 2:
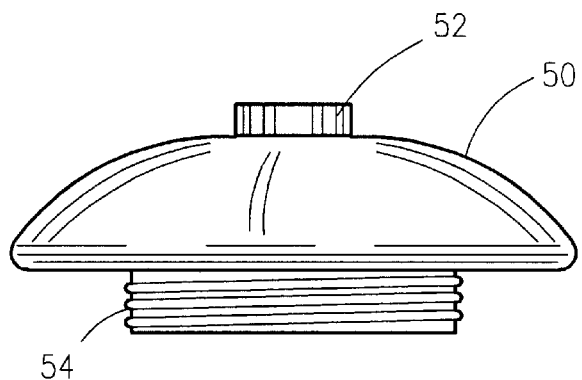
FIG. 2 is a side elevational view of the access lid according to the preferred embodiment of the present invention.

Referring now to FIGS. 1–4, a handled, microwave popcorn service apparatus 10 is shown, according to the present invention, comprised of a portable, lightweight, handled, vented service bowl container 20 for aiding in the eating of popcorn 22 and providing a means to keep a user's hands clean and free from the oils, salt, and/or butter commonly found on popcorn 22. The service bowl container 20 is constructed of a microwave penetrable material formed of an injection molded high-impact thermoplastic, and therefore can be formed easily of recycled material. The service bowl container 20 is of a generally, circular, concave, hollow bowl-like configuration, with a hollow popcorn dispensing tube 30 integrally formed therewith, extending laterally from an external circumferential sidewall therefrom. The dispensing tube 30 is designed not only as an outlet from the service bowl 20, but also serves as a handle for transporting the service bowl 20. The dispensing tube 30 is further designed with a diameter measuring approximately 1.75 inches and a length measuring approximately 4.5 inches.

A rubber grip 40 is mounted around the external circumferential surface of the dispensing tube 30 extending just short the length thereof, and is defined as having a plurality of linearly aligned oval-shaped voids 48 formed on an upper surface thereof so as to allow a user to obtain a firm and comfortable grasp of the present invention.

The service bowl 20 is formed with a generally flat lower surface which serves as a support base. The service bowl 20 includes a bowl body 26 designed and configured with a volume suitable for accommodating popped popcorn 22 from a standard microwave bag of popcorn.

The service bowl 20 further includes a threaded opening 42 formed on a top portion 44 thereof for threadably receiving an access lid 50 having corresponding threads 54 for being removably secured to the top portion 44 of the service bowl 20.

The access lid 50 is concave-shaped and has an integral circular cap 52 positioned centrally along an upper surface thereon. The cap 52 is defined as having vertically aligned grooves 55 formed along its outer periphery so as to facilitate a firm grasp thereof by a user when removing and replacing the access lid 52. The access lid 52 serves to secure popcorn 22 within the bowl body 26, and is easily removed so as to facilitate filling of popcorn 22 therein and cleaning thereof. The access lid 52 also reduces the aroma of popped popcorn 22 in an immediate area which may be undesirable to others.

Egress of popcorn 22 through the dispensing tube 30 is facilitated through a dispensing portal 34. The dispensing portal 34 is defined as having smoothly curved upper and lower surfaces 36, 37 forming obtuse angles which aid in the flow of popped popcorn 22 from the bowl body 26 to the dispensing tube 30.

To use the present invention, a standard bag of microwave popcorn is popped in a microwave oven according to the manufacturer's instructions. Next, the bag is opened and poured into the bowl body 26 through the opening 42 of the top portion 44, and the access lid 50 is screwed thereon. When the user desires popcorn 22, an open end 35 of the dispensing tube 30 is placed against the user's mouth while slightly tipping the handled, microwave popcorn service apparatus 10. The popped popcorn 22 exits the bowl body 26 through dispensing portal 34, through the dispensing tube 30 and into the user's mouth.

Figure 3:
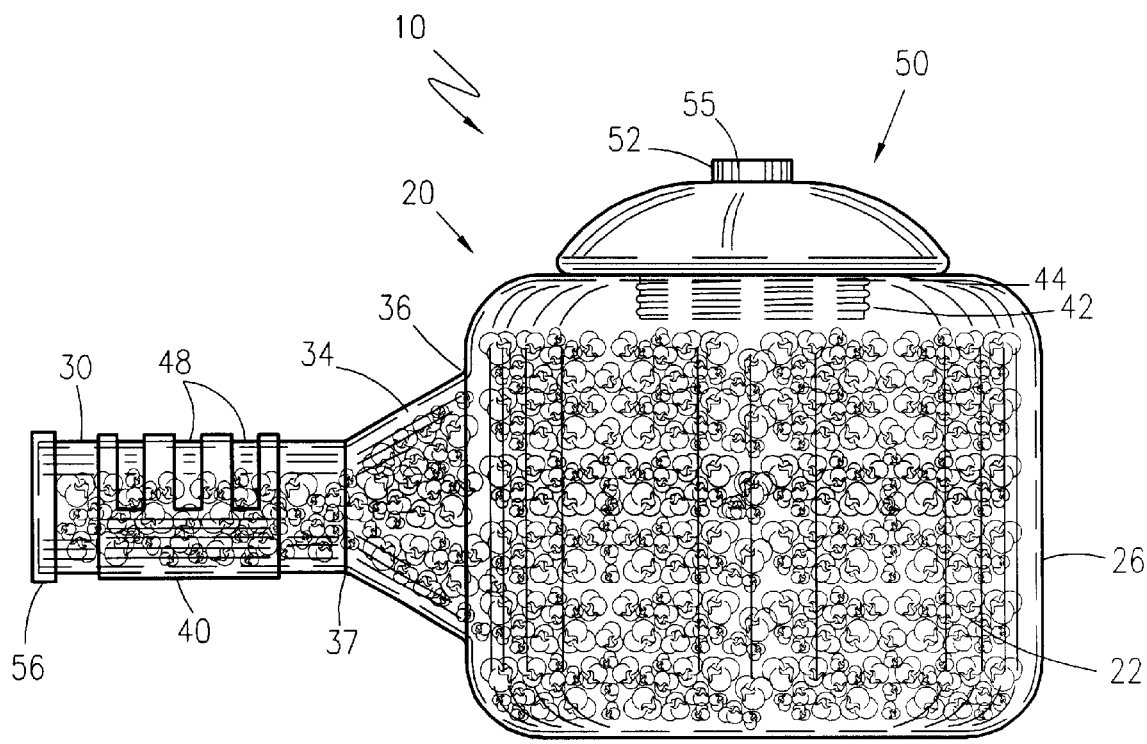
FIG. 3 is a side elevational view of the present invention according to the preferred embodiment shown with a snap-on cover attached.
Figure 4:
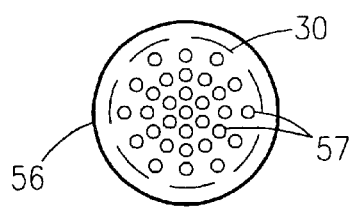
FIG. 4 is a front end elevational view of the dispensing tube shown with a snap-on cover attached thereto.

Referring now to FIGS. 3 and 4, it is envisioned that the handled, microwave popcorn service apparatus 10 is adaptable and useful for popping popcorn 22 in a microwave oven. In order to use the present invention for popping popcorn 22, popcorn kernels to be popped are passed through the opening 42 of the top portion 44, into the bowl body 26, and the access lid 50 is secured thereon. A snap-on cover 56 is provided for being removably secured to the open end 35 of the dispensing tube 30. The snap-on cover 56 is a removable, pliable cover which seats securely enough to maintain attachment during the popping of the popcorn 22, but can be easily removed thereafter. The snap-on cover 56 is defined as having a plurality of apertures 57 formed therein so as to relieve cooking pressure from within the bowl body 26. The handled, microwave popcorn service apparatus 10 is placed in a microwave oven and the popcorn kernels are popped according to manufacturer's instructions. When the user desires popcorn 22, the snap-on cover 56 is removed, and the open end 35 of the dispensing tube 30 is placed against the user's mouth while slightly tipping the present invention. The popcorn 22 exits the present invention as discussed hereinabove.

The handled, microwave popcorn service apparatus 10 provides a means keep the user's hands clean and free from oils, salt, and/or butter commonly found on popcorn 22.

It is envisioned that the present invention is available in a variety of transparent colors.

It is further envisioned that the present invention may be utilized with other snacks including but not limited to peanuts, trail mix, candy pieces, cereal, and other small-sized snacks.

2. Operation of the Preferred Embodiment

To use the present invention, a conventional bag of microwave popcorn is popped in a microwave oven according to the manufacturer's instructions. Next, the bag is opened and poured into the bowl body 26 through the opening 42 of the top portion 44, and the access lid 52 is screwed thereon. When the user desires popped popcorn 22, the open end 35 of the dispensing tube 30 is placed against the users mouth and the invention is tipped slightly. The popped popcorn 22 exits the bowl body 26 through the dispensing portal 34, through the dispensing tube 30 and into the user's mouth.

In the event the user decides to pop popcorn 22 inside the handled, microwave popcorn service apparatus 10, popcorn kernels to be popped are passed through the opening 42 of the top portion 44, into the bowl body 26, and the access lid 52 is secured thereon. The snap-on cover 56 is secured to the open end 35 of the dispensing tube 30. The present invention is placed in a microwave oven and the popcorn kernels are popped according to manufacturer's instructions. When the user desires popcorn 22, the snap-on cover 56 is removed, and the open end 35 of the dispensing tube 30 is placed against the user's mouth while slightly tipping the present invention. The popcorn 22 exits the present invention as discussed hereinabove.

The use of the present invention allows one to enjoy eating popcorn in a manner with less mess and fuss when compared to conventional means using one's hands.

Therefore, the foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. Therefore, the scope of the invention is to be broadly limited only by the following claims.

What is claimed is:

1. A microwave popcorn service apparatus comprising:

service bowl container, said container having a plurality of venting aperture formed within a sidewall therein, wherein said service bowl container is of a generally, circular, concave, hollow bowl-like configuration, with a hollow popcorn dispensing tube integrally formed therewith, extending laterally from an external circumferential sidewall therefrom; and a handle affixed to said service bowl container.

2. A microwave popcorn service of claim 1, wherein said hollow popcorn dispensing tube is designed not only as an outlet from the service bowl, but also serves as a handle for transporting the service bowl.

3. A microwave popcorn service of claim 2, wherein said hollow popcorn dispensing tube is further designed with a diameter measuring approximately 1.75 inches and a length measuring approximately 4.5 inches.

4. The microwave popcorn service of claim 3, further comprising a rubber grip mounted around the external circumferential surface of the dispensing tube and extending just short the length thereof, said rubber grip further defining a plurality of linearly aligned oval-shaped voids formed on an upper surface thereof so as to allow a user to obtain a firm and comfortable grasp.

* * * * *